(12) United States Patent
Eastwood

(10) Patent No.: US 7,940,900 B2
(45) Date of Patent: May 10, 2011

(54) COMMUNICATION CONTROL FOR DEVICE WITH TELEPHONIC FUNCTIONALITY

(75) Inventor: Mark Eastwood, Shrewsbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1154 days.

(21) Appl. No.: 11/566,672

(22) Filed: Dec. 4, 2006

(65) Prior Publication Data
US 2008/0132275 A1   Jun. 5, 2008

(51) Int. Cl.
*H04M 11/00* (2006.01)

(52) U.S. Cl. ............... 379/93.18; 379/93.19; 379/90.01; 455/556.1

(58) Field of Classification Search ............... 379/93.18, 379/93.19, 90.01, 93.05, 93.06, 93.07; 455/518, 455/416, 432.1, 519, 520, 556.1
See application file for complete search history.

(56) References Cited

U.S. PATENT DOCUMENTS

| | | | |
|---|---|---|---|
| 6,208,972 B1 * | 3/2001 | Grant et al. ................... | 704/275 |
| 7,251,499 B2 * | 7/2007 | Ella et al. ................... | 455/552.1 |
| 2001/0041590 A1 * | 11/2001 | Silberfenig et al. .......... | 455/556 |
| 2005/0233733 A1 * | 10/2005 | Roundtree et al. .......... | 455/414.1 |
| 2007/0037536 A1 * | 2/2007 | Battaglini et al. ............ | 455/212 |
| 2007/0266077 A1 * | 11/2007 | Wengrovitz ................. | 709/203 |

* cited by examiner

*Primary Examiner* — Melur Ramakrishnaiah
(74) *Attorney, Agent, or Firm* — Fenwick & West LLP

(57) ABSTRACT

A system and a method are disclosed for controlling voice communications through a mobile computing device. In one embodiment, a mobile computing device enabled for telephony communications establishes a telephone call to transmit voice signals and mutes the established telephone call. When ready to transmit voice signals, a control switch configured on the mobile computing device is depressed and held for a duration in which to transmit those voice signals in the established telephone call. Once transmission of the voice signals is completed, the control switch is released to re-mute the established telephone call.

20 Claims, 10 Drawing Sheets

COMMUNICATION CONTROL FOR DEVICE WITH TELEPHONIC FUNCTIONALITY

BACKGROUND

1. Field of Art

The field generally relates to the field of communication control through a mobile computing device having telephonic functionality.

2. Description of the Related Art

In voice communication systems, two parties communicate with each other through a voice communication device. In some instances it is desirable to have one party not transmit voice signals through their voice communication device. Examples of such scenarios include transmitting from areas that have lots of background noise, e.g., an airport terminal or a large social or business gathering. In such situations, the party from where the background noise is originating mutes their communication devise.

Communication devices that leverage off of simplex communication systems have established conventional mute functionality. In simplex communications systems, e.g., walkie talkie type systems, this can be done by simply not enabling the voice channel on the voice communication device until a voice signal is ready for transmission. However, such devices lose downlink communications when the voice signal is being transmitted. In situations in which parties desire greater certainty, such systems are not desirable because the simplex communication system may result in loss of valuable communication information due to the lost downlinks.

In contrast to simplex communication systems, a conventional telephone call establishes a telephone call between parties through a two-way, duplex communication that continually receives a downlink voice communication and allows for simultaneous uplink voice communication between the telephonic device and telecommunications network. Communications in this configuration lose very little, if any, data due to the continuous nature of the communication channel. However, when any party on the telephonic device wants to prevent voice signals from an uplink, they place the device in a mute state by pressing a conventional mute button. A problem with the conventional mute button is that party invoking the button on their device must consistently press or unpress the button in order to talk on the established telephone call. The continual mute and unmute process is cumbersome and quite inconvenient for users that regularly engage in multi-tasking.

Hence, there includes a need for a more convenient manner in which to mute communications, and thereafter, immediately partake in an established telephone call before returning to mute.

SUMMARY

One aspect of a disclosed system (and method) includes a telephonic device structured with a switch configured to mute and unmute an established telephone call between parties. Unlike conventional mute and unmute configurations, the present structure is configured to have the established call remain in a mute state and transition to an unmute state upon continually actuating (or activating) (e.g., pressing (or depressing) and holding or touching and maintaining touch) a switch. Once the switch is no longer actuated (or deactivated) (e.g., released) the call returns back from the unmute state to the mute state.

In one embodiment, a telephonic device includes a mobile computing device structured for voice communications (analog or digital), e.g., a mobile phone, a smart phone, or a laptop computer configured with telephone functionality. In one embodiment, one or more switches are configured with the device. When the device establishes a telephone call to transmit voice (or other sound signals), the established call may automatically default to a mute state or be placed in a mute state through a switch. When a user of the device seeks to have the device go from a mute state to an unmute state so that voice communications can be transmitted, the user continually actuates (e.g., presses and holds) a control switch for a duration in which to transmit voice into the established telephone call. With device now in an unmute state, the user can transmit voice that can be heard by other parties on the established call. Once the control switch is de-actuated (e.g., released) by the user, the call returns to the mute state.

It is noted that in the switches can be hardware elements, software elements, or a combination thereof. Examples of a hardware element include a push button, a slider, or rocker switch on the device itself Examples of a software element include a button on a touch (or inductive) sensitive screen. Examples of a combination may be an unmute application that renders an interface to instruct the user that a physical key or button on the mobile computing device corresponds to a control switch for the unmute functionality. In addition, it also is noted that voice communications refers to any sound communication transmitted through the telephonic device, e.g., the mobile computing device.

The configuration described is advantageous in a number of communication scenarios. For example, a user (caller) on a conference call that is in a noisy environment, e.g., an airport terminal, is able to stay on mute for the telephone call until the user seeks to interject into the conversation. At that time, the user continually actuates (e.g., presses and holds) the switch associated with the unmute state and speaks into the device as in a regular phone conversation. Once the user completes what they are saying, the user de-actuates (e.g., releases) the switch and the call automatically returns to the mute state. By "defaulting" to a mute state, the user is no longer burdened with having to perform two separate actions. Specifically, the user need not take independent steps to unmute the call to interject into the active telephone call and then re-mute the call in order to go back to mute; rather the task is reduced to a single action of continually actuating a switch, e.g., pressing and holding, for a duration to activate transmission of voice into the call and then de-actuating that same switch, e.g., by releasing it, to return to the mute state. This provides greater convenience and ease of use to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, the disclosed embodiments describe a telephone configuration for use with voice communication over a duplex communication system. The telephone configuration is described below through a mobile computing device, for example, a mobile phone, a smart phone (e.g., using a cellular or a data infrastructure), or a laptop having telephonic functionality (e.g., a software phone application). However, the principles disclosed may be applicable to other duplex telephonic configurations. In addition, voice communications include any sound communications in addition to voice. The duplex communication system may be a wireless/cellular system, a land line based system, a satellite system, or a combination thereof.

Example Mobile Computing Device

FIGS. 1a-1d are external views illustrating one embodiment of a mobile computing device with telephonic functionality, e.g., a smart phone. The computing device is configured to host and execute a phone application for placing and receiving telephone calls. It is noted that for ease of understanding the principles disclosed herein are in an example context of a mobile computing device with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

Figure 1A:
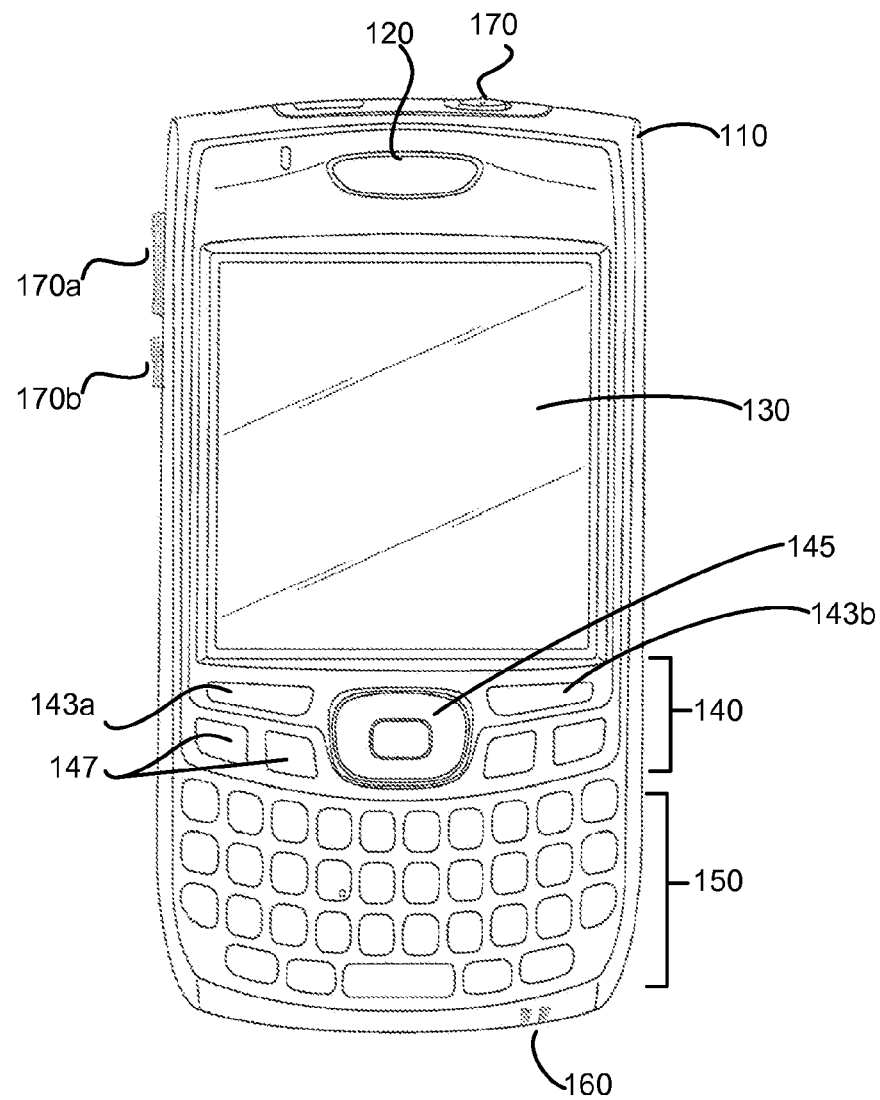
FIGS. 1a-1d are external views illustrating one embodiment of a mobile computing device with telephonic functionality, e.g., a smart phone.
Figure 1B:
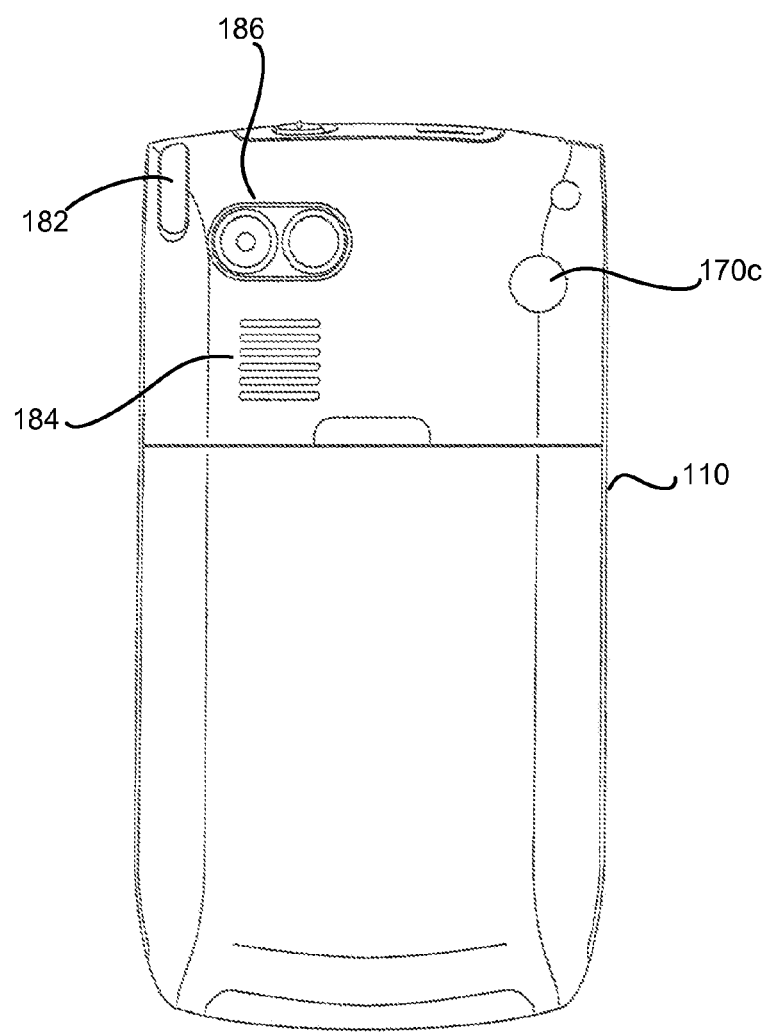
Figure 1C:
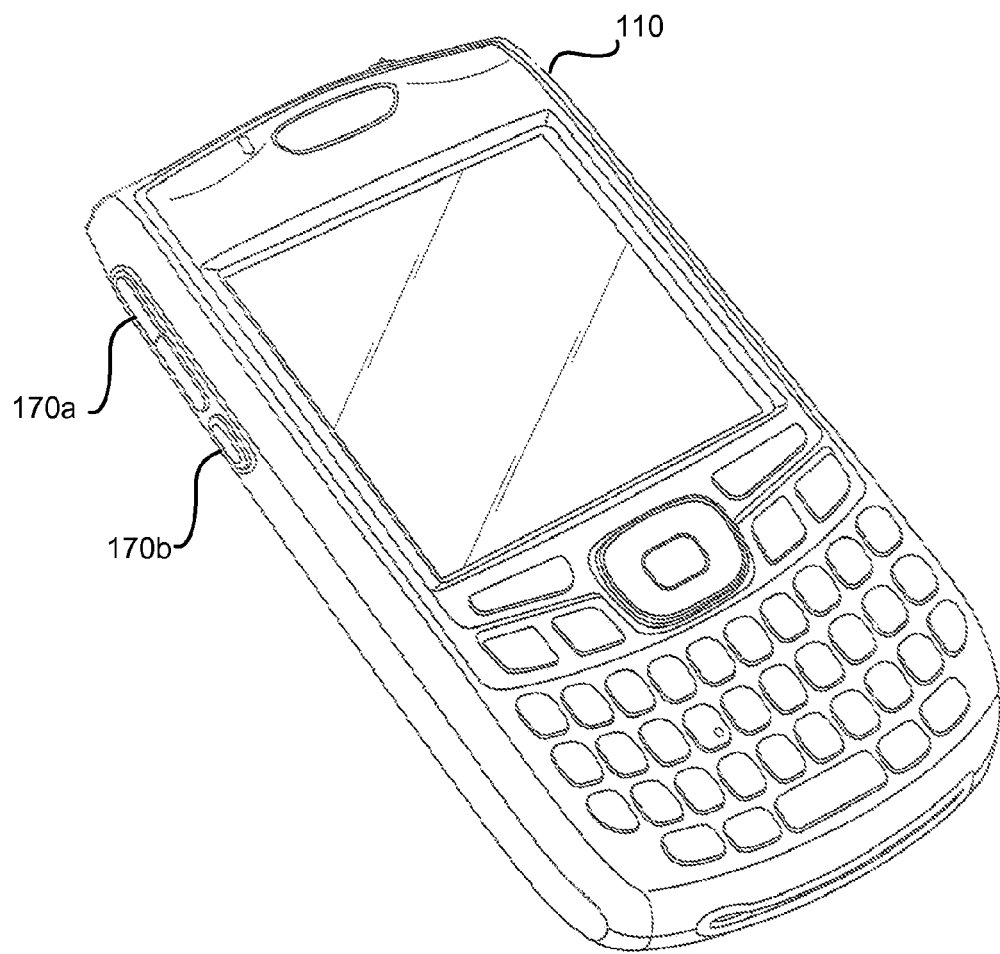

FIGS. 1a through 1c illustrate embodiments of a mobile computing device 110 in accordance with the present invention. As illustrated through a front face view in FIG. 1a, the mobile computing device 110 is configured to be of a form factor that is convenient to hold in a user's hand, for example, a personal digital assistant (PDA) or a smart phone form factor. For example, the mobile computing device 110 can have dimensions that range from 3 to 6 inches by 2 to 5 inches by 0.25 to 0.85 inches and weigh between 3 and 7 ounces.

The mobile computing device 110 includes a speaker 120, a screen 130, a navigation area 140, a keypad area 150, and a microphone 160. The mobile computing device 110 also may include one or more switches 170a-c (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective TFT color display that includes touch screen or inductive pen support. The navigation area 140 is configured to control functions of an application executing in the mobile computing device 110 and visible through the screen 130. For example, the navigation area includes an x-way (x is e.g., 5) navigation ring 145 that provide cursor control, selection, and the like. In addition, the navigation area 140 may include selection buttons 143 to select functions viewed just above the buttons on the screen 145. In addition, the navigation area also may include dedicated function buttons 147, e.g., for functions such as calendar or home screen. In this example, the navigation ring 145 may be through mechanical, solid state switches, dials, or a combination thereof. The keypad area 150 may be a numeric keypad (e.g., a dialpad) or a numeric keypad integrated with an alpha or alphanumeric keypad 160 (e.g., QWERTY, AZERTY, or other equivalent keyboard).

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

FIG. 1b illustrates a rear-view of the example mobile computing device 110. The rear-view illustrates additional features of the mobile computing device, including, a stylus housing (for holding a stylus) 182, a second speaker (e.g., for speaker phone functionality) 184, and a camera 186. Also illustrated is another switch 170 that can be used to control functions, such as the ones further described below, of the mobile computing device 110.

Figure 1D:
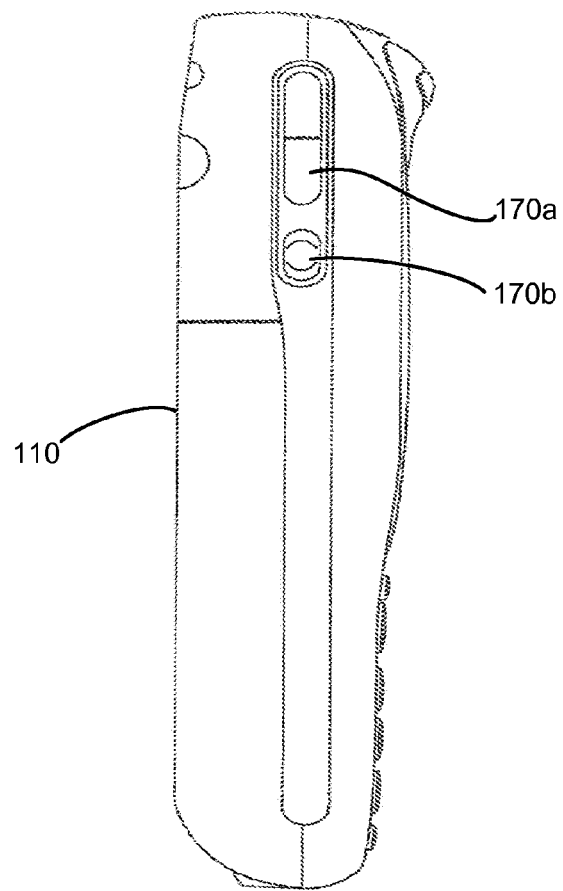

In addition, FIG. 1c illustrates a perspective view of the mobile computing device 110. FIG. 1d illustrates a side view of the mobile computing device 110. The views in FIGS. 1c and 1d provide additional visual details of example switches 170 for use with applications running on the mobile computing device 110. For example, one switch can be a rocker switch 170a while another can be a push button switch 170b. Again, it is noted that these switches can be configured as mechanical switches or solid state switches.

Example Mobile Computing Device Architectural Overview

Figure 2:
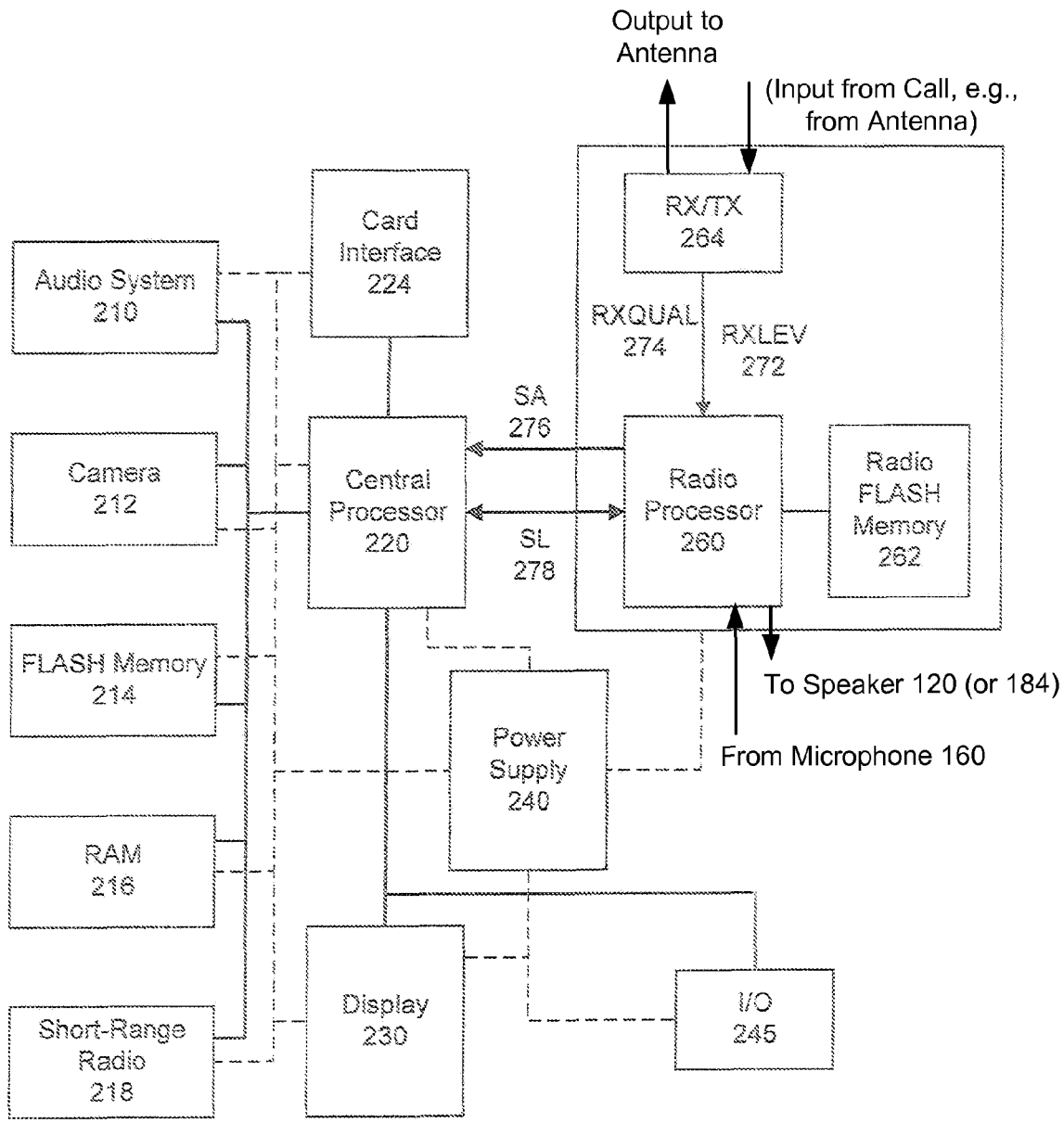
FIG. 2 is a block diagram illustrating one embodiment of an architecture of a mobile computing device with telephonic functionality.

Referring next to FIG. 2, a block diagram illustrates one embodiment of an architecture of a mobile computing device, e.g., 110, with telephonic functionality. By way of example, the architecture illustrated in FIG. 2 will be described with respect to the mobile computing device of FIGS. 1a-1d. The computing device 200 includes a central processor 220, a power module 240, and a radio subsystem 250. The central processor 220 communicates with: audio system 210, camera 212, flash memory 214, RAM memory 216, and short range radio module 218 (e.g., Bluetooth, Wireless Fidelity (WiFi), or WiMAX component). The power module 240 powers the central processor 220 and the radio subsystem 250. Other components that communicate with the processor 220 and which are powered by power module 240 include a display 230 (which may be contact-sensitive) and one or more input/output mechanisms (e.g., buttons, keyboards etc.). The power module 240 may correspond to a battery pack (e.g., rechargeable) or a powerline connection or component. Numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a receiver (Rx)/transmitter (Tx) 264. The receiver (Rx)/transmitter (Tx) 264 may be two separate components or a single component. In either instance, it also may be referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278. In one embodiment, central processor 220 executes logic (by way of programming, code, instructions) corresponding to executing applications interfaced through, for example, the navigation area 140 or switches 170.

State Configuration

Figure 3:
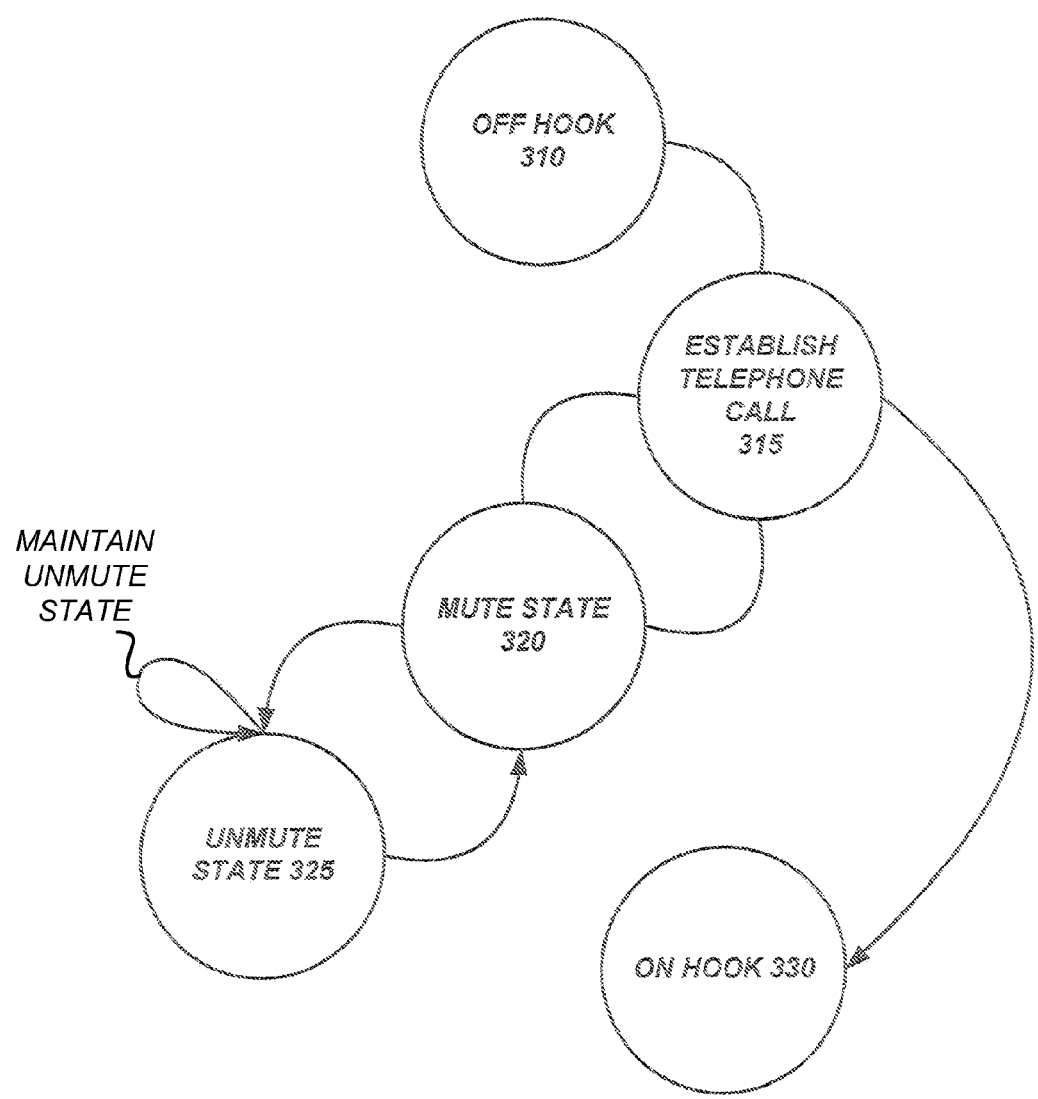
FIG. 3 is a state diagram illustrating one embodiment of a communication control (mute and unmute) application.

FIG. 3 is a state diagram illustrating one embodiment of process for a communication control (mute and unmute) application (or applet). In one embodiment, when a user (or party) of the mobile computing device 110 is ready to participate in a telephone call, they enable the telephonic functionality of the device 110 and place it in an off-hook state 310. The off-hook state includes preparing the device 110 to partake in a telephone call (either through a cellular network, data network, and/or a public switch telephone network (PSTN)) that will be established between one or more other parties. From the off-hook state, the device 110 transitions to an establish (or active) telephone call state 315. The establish telephone call state 315 results in the device 110 being communicatively connected (or coupled) through a duplex communications system with one or more other devices either through placing (e.g., dialing) the call or receiving the call. If the call between the parties is ended or the device 110 hangs up the call, the device 110 transitions to an on-hook state 330.

When the call is in the establish telephone state 315, the parties can communicate with each other. In one embodiment, with the mobile computing device 110, in the establish telephone state 315 occurs, the device 110 executes the communication control application (e.g., processor or controller readable firmware or other software instructions) to place the device 110 in a mute state 320 by blocking voice (or other sound) from being transmitted from the microphone 160 into the established call. Thus, in the mute state 320, one or more other parties on the established call do not receive voice (or other sound) originated from a location of the user of the device 110.

The application can be configured so that it is in a mute state automatically at the initiation of the establish call state 315, e.g., as soon as the call between the two or more parties is established either by the user (who may have dialed the called from the device 110) or another party (in which case the user received the call on the device 110). Alternatively, the communication control application can be configured so that it is triggered by the user that places the device 110 into the mute state 320.

When the user of the device 110 seeks to speak into the established call, the user unmutes the call by continuously (e.g., uninterrupted) actuating (or activating or enabling) a control switch, e.g., 143, 170b, on the mobile computing device 110. The application is structured so that the control switch communicatively enables transmission of voice (or sound) from the device 110. In one embodiment, continually actuating the control switch, e.g., 170b, includes enabling an electrical circuit. For example, the control switch, e.g., 170b, can be structure so that when it is continually actuated (e.g., pressed and held), the electrical circuit enables transmission can be through the microphone on the mobile computing device 110. In another example, the electrical circuit is enabled to trigger functionality of the radio processor 260 to perform an action such as transmitting the voice (or sound). In each instance, once the application enters an unmute state 325 the user can speak (transmit voice (or sound)) into the established call for a duration in which the switch remains enabled.

In a preferred embodiment, the switch is a mechanical switch, e.g., a push button 170b, that is actuated (e.g., pressed and held) for the duration in which the microphone is to remain enabled (maintain an unmute state) for the user to speak into the established call. When the switch, e.g., push button 170, is de-actuated (e.g., released) the application automatically returns to the mute state 320 to mute the microphone 160.

In an alternative embodiment, the switch may be a solid state switch, e.g., 170c. The application may be configured so that when the solid state switch is continually touched (e.g., touched and maintaining that touch), it enables the electronic circuit, e.g., to enable the microphone 160 and/or the radio processor 260. Again, for the duration the solid state switch is touched and maintained, the application is in an unmute state 325 and when it is released the application automatically returns to the mute state 320.

In yet another embodiment, the switch may be a tension-enabled dial, slider, or rocker switch, e.g., 170a, which has an at rest (or home or first) position and an actuated (or second) position. The tension-enabled aspect of the switch results in the actuated (or second) position to be continually presses or held else the switch returns back to the rest (or home or first) position. Hence, the application as disclosed can be configured so that when the tension-enabled switch is continually positioned in the actuated (or second) position, it enables the electronic circuit, e.g., to enable the microphone 160 and/or the radio processor 260. Again, for the duration the tension-enabled switch is continually actuated, the application is in an unmute state 325 and when it is released the application automatically returns to the mute state 320.

In yet another embodiment, the communication control (or mute/unmute) application can be further integrated with an operating system, e.g., Windows Mobile™ or Palm OS™ or Symbian OS, so that the control switch comprises a software rendered control switch displayed on a touch screen 130 and interactable directly through the touch screen. Like the solid state switch, the application may be configured so that when a button (e.g., a button icon) on the touch screen 130 is continually touched (e.g., touched and maintained touch) the application to enables the electronic circuitry for the microphone 160 and/or the radio processor 260 to transmit voice (or other sound). Again, for the duration the button on the touch screen 130 is touched, the application is in an unmute state 325 and when it is released the application automatically returns to the mute state 320.

In still another embodiment, the communication control application is integrated with the operating system so that the application displays on the screen 130 of the device, instructions for a button, e.g., 143, or key (e.g., on the keyboard 150) that corresponds to providing the continual switch function. When the unmute state is desired, a user of the device 110 will continually actuate (e.g., press and hold) the button or key for the duration in which the user seeks to speak into the established telephone call.

Figure 4A:
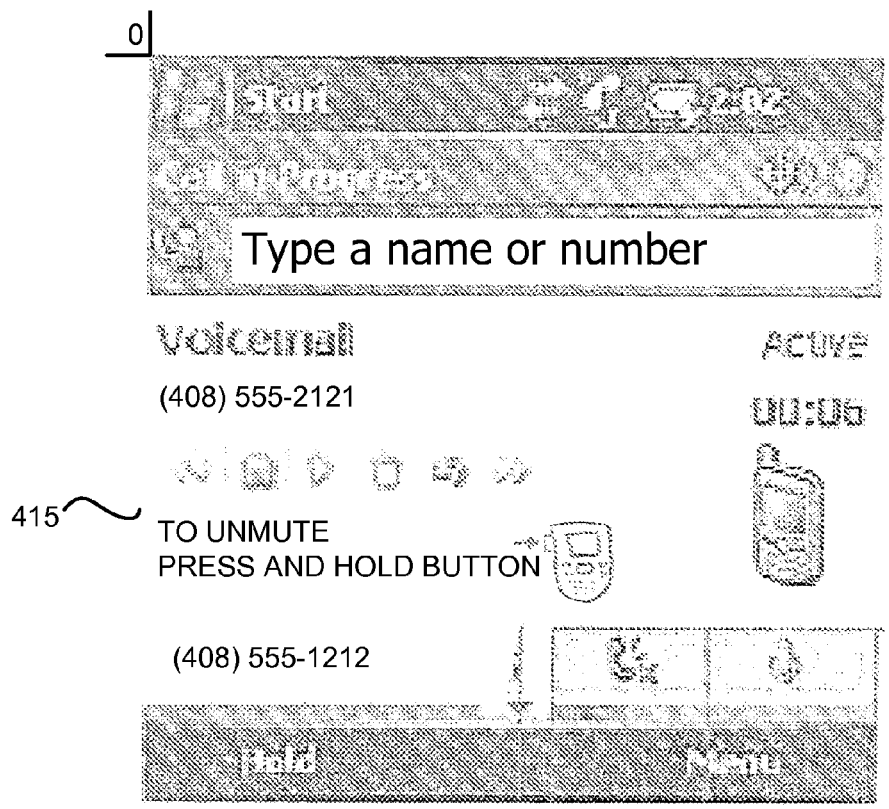
FIGS. 4a-4d are example embodiments of user interface screens for a communication control (mute and unmute) application.
Figure 4B:
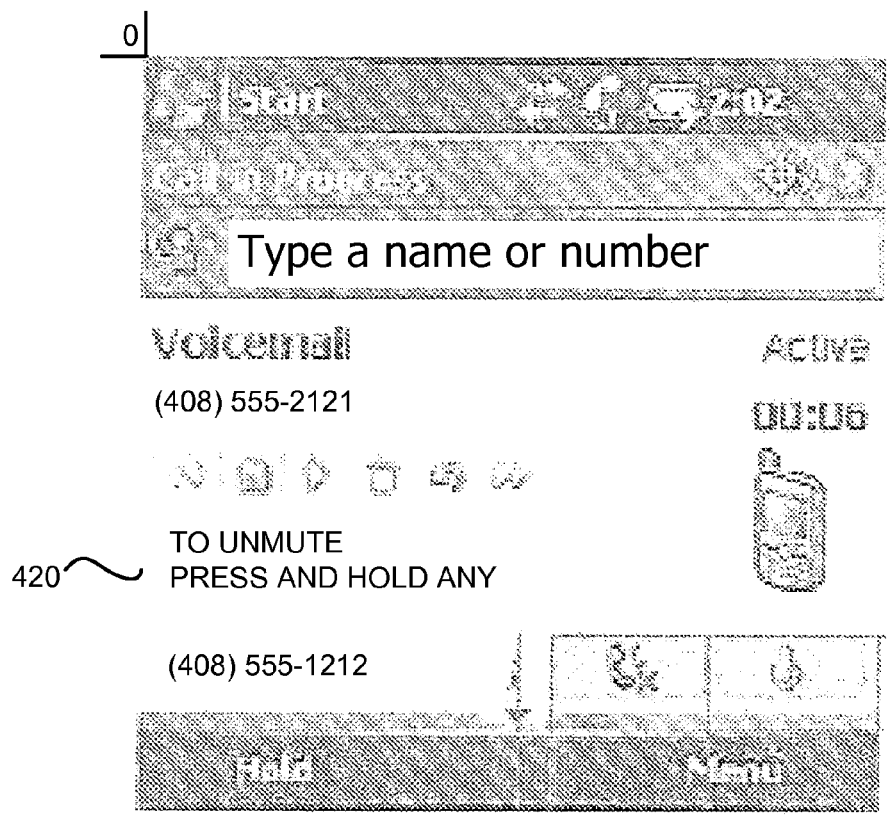

FIGS. 4a-4d are example embodiments of user interface screens 410a-d for use with a communication control (mute and unmute) application. In FIG. 4a, the user interface 410 rendered on the screen 130 of the device 110 instructs 415 a user to "press and hold" a control switch (e.g., 170c) on the side of the device 110. In FIG. 4b, the user interface 420 rendered on the screen instructs the user to press and hold any key, for example, on a dialpad or alphanumeric keyboard (such as a QWERTY, AZERTY, or equivalent). Still other graphical user embodiments (not shown) may instruct the user to press and hold one of the selection buttons, e.g., 143a or 143b, for a duration of a desired unmute state, e.g., 325.

Figure 4C:
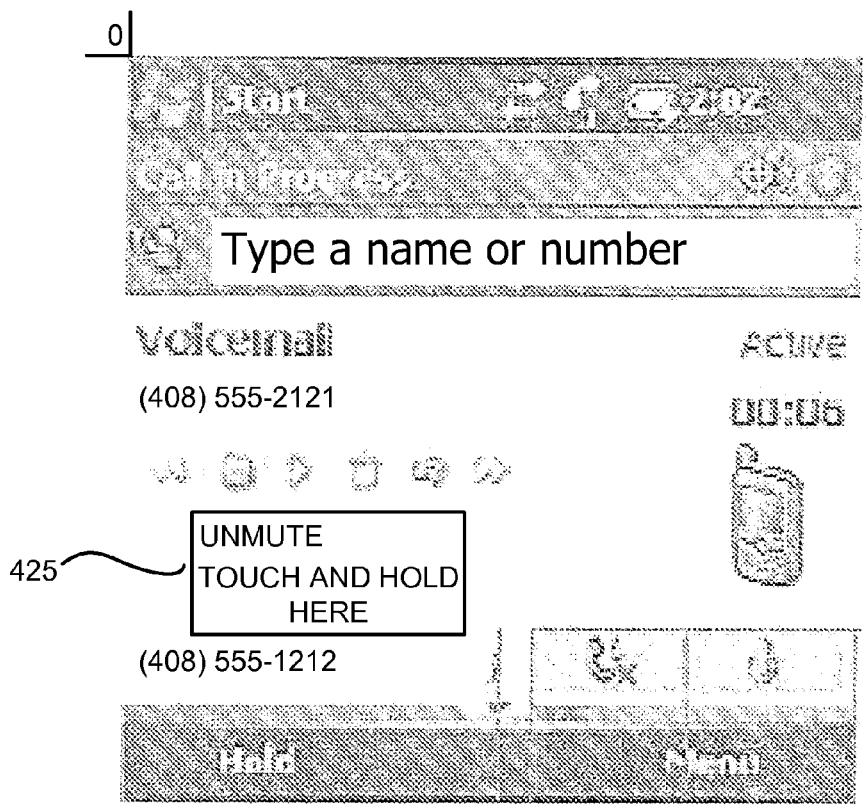
Figure 4D:
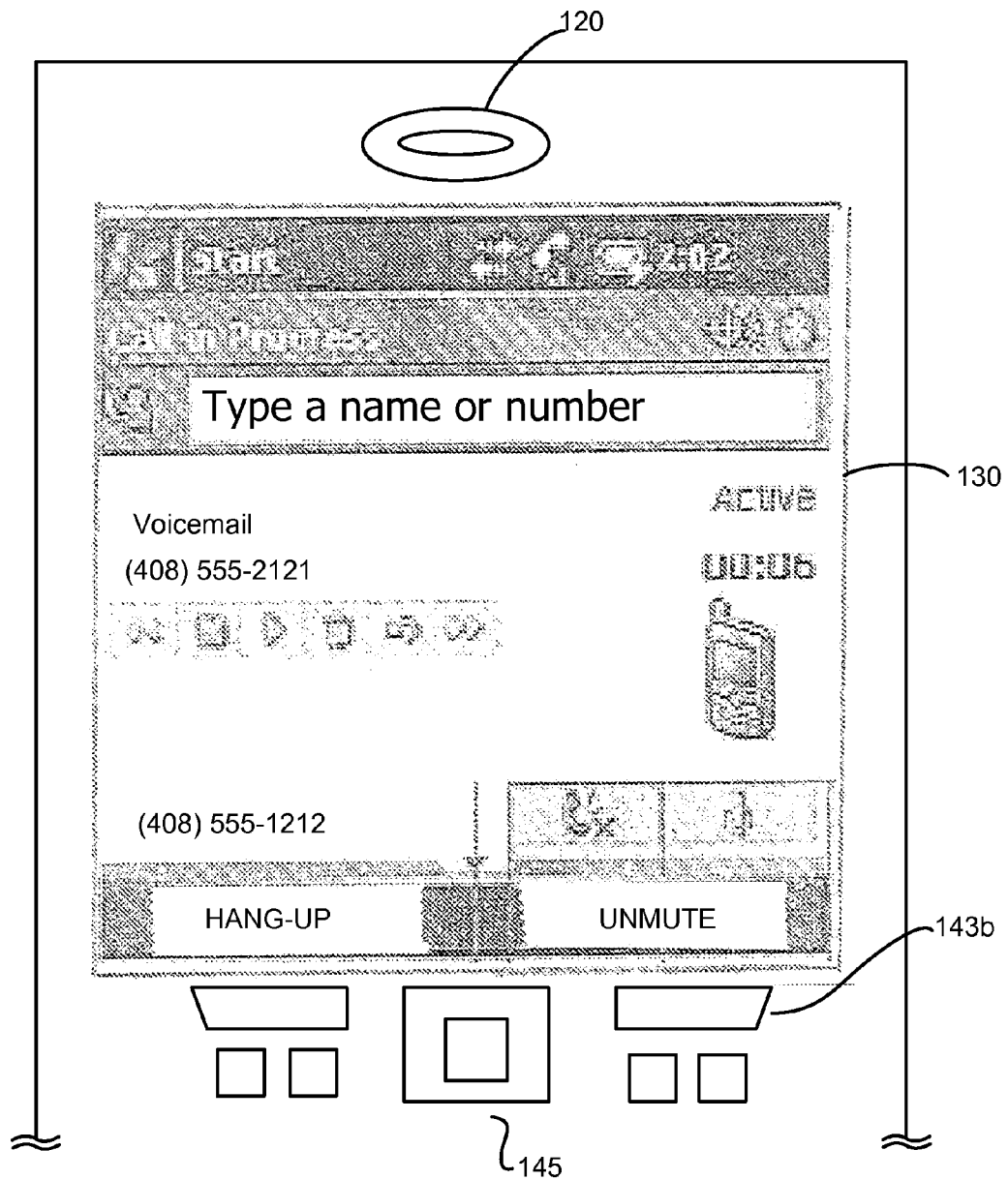

In FIG. 4c the control switch to unmute in a communications control application is an interface button 425 on a touch enabled screen of the mobile computing device 110. As noted above, the touch button would be continually touched (e.g., touch and maintain touch) in order to move to an unmute state for a duration of a time the user speaks in an established call. In FIG. 4d the communication control application assigns a selection button, e.g., 143b, on the mobile computing device 110 to be the control switch that is continually actuated (e.g., touched) for the unmute state, e.g., 325.

The embodiments disclosed provide functional advantages for mobile computing devices 110 having telephonic functionality. Moreover, the disclosed embodiments disclosed beneficially provide push to unmute functionality in duplex communication systems (or networks).

The communication control application operation can be described further by way of example. A user (caller) on a conference call may connect with (or otherwise join) an established call in a duplex communication system. Moreover, the use may be in a noisy environment, e.g., an airport terminal or a large conference gathering. The disclosed embodiments allows the user to establish or enter an established call in a mute state or state in a mute state, introduce themselves, and then place the device in a mute state. Alternatively, once the device couples to an established call the device can automatically move to the mute state, e.g., 320. Once the device 110 is in the mute state, e.g., 320, the user device 110 stays on mute for the telephone call until the user seeks to speak into the conversation. At that time, the user continually actuates (e.g., presses and holds) the switch associated with the unmute state, e.g., 325, on the device 110 to enable the user's voice to be heard in the conversation in the established call. Once the user completes what they are saying, the user de-actuates (e.g., releases) the switch and the call automatically returns to the mute state, e.g., 320. By "defaulting" back to a mute state, the user is no longer burdened with having to perform two separate actions to unmute the call and then re-mute the call in order to interject into the telephone call; rather the task is reduced to a single action of continually actuating a switch, e.g., pressing and holding, for a duration to activate transmission of voice into the call and then de-actuating that same switch, e.g., by releasing it, to return to the mute state. This provides greater convenience and ease of use to the user.

It is noted that the communications control application can be dynamically configured. For example, a control switch, e.g., 170a, 170b, 170c, 425, 143b, can be configured to be either dedicated or dynamically assigned by the application. Moreover, the application also can be configured to determine is a particular switch is already assigned to another function when the call is established. If so, the application is configured to assign the unmute functionality to another switch (either a mechanical, electrical (e.g., solid state), software, or combination thereof). In addition, it is noted that the principles of maintaining a mute state until unmuting for a duration of time while a switch is activated may also apply to other applications such as wireless systems, such as Bluetooth or WiFi.

As used in the within, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments have been described using the expression "coupled" and "connected" along with their derivatives. It should be understood that these terms may not be synonyms for each other in the particular contexts. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used within, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an communication control configuration through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a mobile computing device enabled for telephony communications, a method comprising:
    establishing a telephone call to transmit voice signals;
    muting the established telephone call;
    continually actuating a control switch for a duration in which to transmit voice signals in the established telephone call and continually enabling a speaker to output communications signals received by the mobile computing device regardless of the actuation of the control switch; and
    releasing the control switch, the released control switch re-muting the established telephone call.

2. The method of claim 1, wherein the control switch comprises a physical switch.

3. The method of claim 2, wherein the physical switch is on a side of the mobile computing device.

4. The method of claim 2, wherein the physical switch is on a back face of the mobile computing device.

5. The method of claim 2, wherein the physical switch is on a front face of the mobile computing device.

6. The method of claim 1, wherein the mobile computing device comprises a touch screen.

7. The method of claim 6, wherein the control switch comprises a software button displayed on the touch screen and interactable directly through the touch screen.

8. The method of claim 1, wherein a screen of the mobile computing device displays a communication control application notating one of a physical button or key on the mobile computing device corresponding to the control switch.

9. The method of claim 1, wherein continually actuating comprises pressing and holding a button on the mobile computing device.

10. The method of claim 9, wherein continually actuating comprises actuating and maintaining a tension switch from a first position to a second position, a release of the tension switch automatically returning the tension switch to the first position.

11. A computer readable medium configured to store instructions executable by a processor of a mobile computing device, the instructions when executed by the processor cause the processor to:
    establish a telephone call to transmit voice signals;
    mute the established telephone call;
    unmute the established telephone call in response to continuous actuation of a control switch on the mobile computing device for a duration in which to transmit voice signals in the established telephone call and continually enable a speaker to output communications signals received by the mobile computing device regardless of the continuous actuation of the control switch; and
    re-mute the established telephone call in response to releasing the continuous actuation of the control switch.

12. The computer readable medium of claim 11, wherein the mobile computing device comprises a touch screen.

13. The computer readable medium of claim 12, wherein the control switch comprises a software button displayed on the touch screen and interactable directly through the touch screen.

14. The computer readable medium of claim 11, wherein a screen of the mobile computing device displays a communication control application notating one of a physical button or key on the mobile computing device corresponding to the control switch.

15. The computer readable medium of claim 11, wherein the control switch comprises a button mechanism and the continuous actuation corresponds to the pressing and holding the button mechanism.

16. The computer readable medium of claim 11, wherein the control switch comprises a solid state switch and the continuous actuation corresponds to touching and maintaining touch on the solid state switch.

17. The computer readable medium of claim 11, wherein the control switch comprises a tension-enabled switch and the continuous actuation corresponds to movement of the tension-enabled switch from a first position and holding it in a second position, the tension-enabled switch returning to the first position when released from the second position.

18. A mobile computing device enabled for telephony communications, the device comprising:
    a means for establishing a telephone call to transmit voice signals;
    a means for initially muting the established telephone call;
    a means for transmitting voice signals in the established telephone call in response to continually actuating a control switch for a duration and a means for outputting communications signals received by the mobile computing device regardless of the actuation of the control switch; and
    a means for re-muting the established telephone call in response to releasing the control switch.

19. The mobile computing device of claim 18, wherein the means for establishing the telephone call comprises a telephony module and the means for initially muting the established telephone call comprises an electrical circuit for disabling a microphone of the mobile computing device.

20. The mobile computing device of claim 19, wherein the means for transmitting the voice signals comprises an electrical circuit for enabling the microphone of the mobile computing device and the means for re-muting the established telephone call comprises an electrical circuit for re-disabling the microphone of the mobile computing device.

* * * * *